United States Patent
Vanhelle et al.

(10) Patent No.: US 8,797,153 B2
(45) Date of Patent: Aug. 5, 2014

(54) ROTARY CONTROL DEVICE WITH HAPTIC FEEDBACK

(75) Inventors: Stephane Vanhelle, Marignier (FR); Jean-Marc Tissot, Viuz en Sallaz (FR)

(73) Assignee: DAV, Creteil Cedex (FR)

( * ) Notice: Subject to any disclaimer, the term of this patent is extended or adjusted under 35 U.S.C. 154(b) by 57 days.

(21) Appl. No.: 13/496,704

(22) PCT Filed: Sep. 16, 2010

(86) PCT No.: PCT/FR2010/000623
§ 371 (c)(1), (2), (4) Date: Jun. 19, 2012

(87) PCT Pub. No.: WO2011/033193
PCT Pub. Date: Mar. 24, 2011

(65) Prior Publication Data
US 2012/0249315 A1 Oct. 4, 2012

(30) Foreign Application Priority Data
Sep. 16, 2009 (FR) ..................................... 09 04427

(51) Int. Cl.
*G08B 6/00* (2006.01)
*H01H 9/00* (2006.01)
(52) U.S. Cl.
USPC ........... 340/407.2; 340/407.1; 200/4; 200/5 R
(58) Field of Classification Search
USPC ............. 340/407.1, 407.2, 392.2, 425.5, 575, 340/576; 180/402, 409, 411; 701/42, 51, 701/69; 345/156, 157, 158, 163, 184; 248/652; 200/4, 5 R, 61.54
See application file for complete search history.

(56) References Cited

U.S. PATENT DOCUMENTS

| | | | |
|---|---|---|---|
| 5,187,630 A | 2/1993 | MacKay et al. | |
| 6,154,201 A | 11/2000 | Levin et al. | |
| 7,086,243 B2 * | 8/2006 | Sato et al. | 62/178 |
| 7,499,023 B2 * | 3/2009 | Onodera | 345/156 |
| 7,579,559 B2 * | 8/2009 | Schelbert et al. | 200/4 |
| 2002/0057152 A1 * | 5/2002 | Elferich et al. | 335/220 |

(Continued)

OTHER PUBLICATIONS

International Search Report w/translation from PCT/FR2010/000623 dated Feb. 4, 2011 (4 pages).

(Continued)

*Primary Examiner* — Van T. Trieu
(74) *Attorney, Agent, or Firm* — Osha Liang LLP

(57) ABSTRACT

The present invention relates to a rotary control device with haptic feedback to be mounted in a control panel (5) of a motor vehicle, said rotary control device (1) comprising: a rotary control member (2), an angular sensor (3a, 3b, 3c) representative of the angular position of said rotary control member (2) and the output of which is intended to be connected to a processing unit of said motor vehicle, a device for generating haptic feedback (4), which is coupled to said rotary control member (2) in order to apply vibration to said rotary control member (2), characterized in that said rotary control member (2) has a control surface (6) of a general planar shape, which is intended to be substantially flush with said control panel (5) and in that said device for generating haptic feedback (4) is intended to be controlled by said processing unit in order to select a predetermined vibration from a plurality of predefined vibrations in such a way that said generating device (4) applies the selected vibration to said rotary control member (2) in response to the output signal of said angular sensor (3a, 3b, 3c).

11 Claims, 1 Drawing Sheet

(56) References Cited

U.S. PATENT DOCUMENTS

| | | |
|---|---|---|
| 2003/0006958 A1 | 1/2003 | Onodera |
| 2004/0119683 A1* | 6/2004 | Warn et al. .................... 345/156 |
| 2005/0230594 A1* | 10/2005 | Sato et al. .................... 248/652 |
| 2005/0259088 A1* | 11/2005 | Ogasawara et al. ........... 345/184 |
| 2006/0038781 A1* | 2/2006 | Levin ............................. 345/163 |
| 2006/0255683 A1 | 11/2006 | Suzuki et al. |
| 2008/0088577 A1* | 4/2008 | Lenneman et al. ........... 345/156 |

OTHER PUBLICATIONS

Written Opinion from PCT/FR2010/000623 dated Feb. 4, 2011 (5 pages).

\* cited by examiner

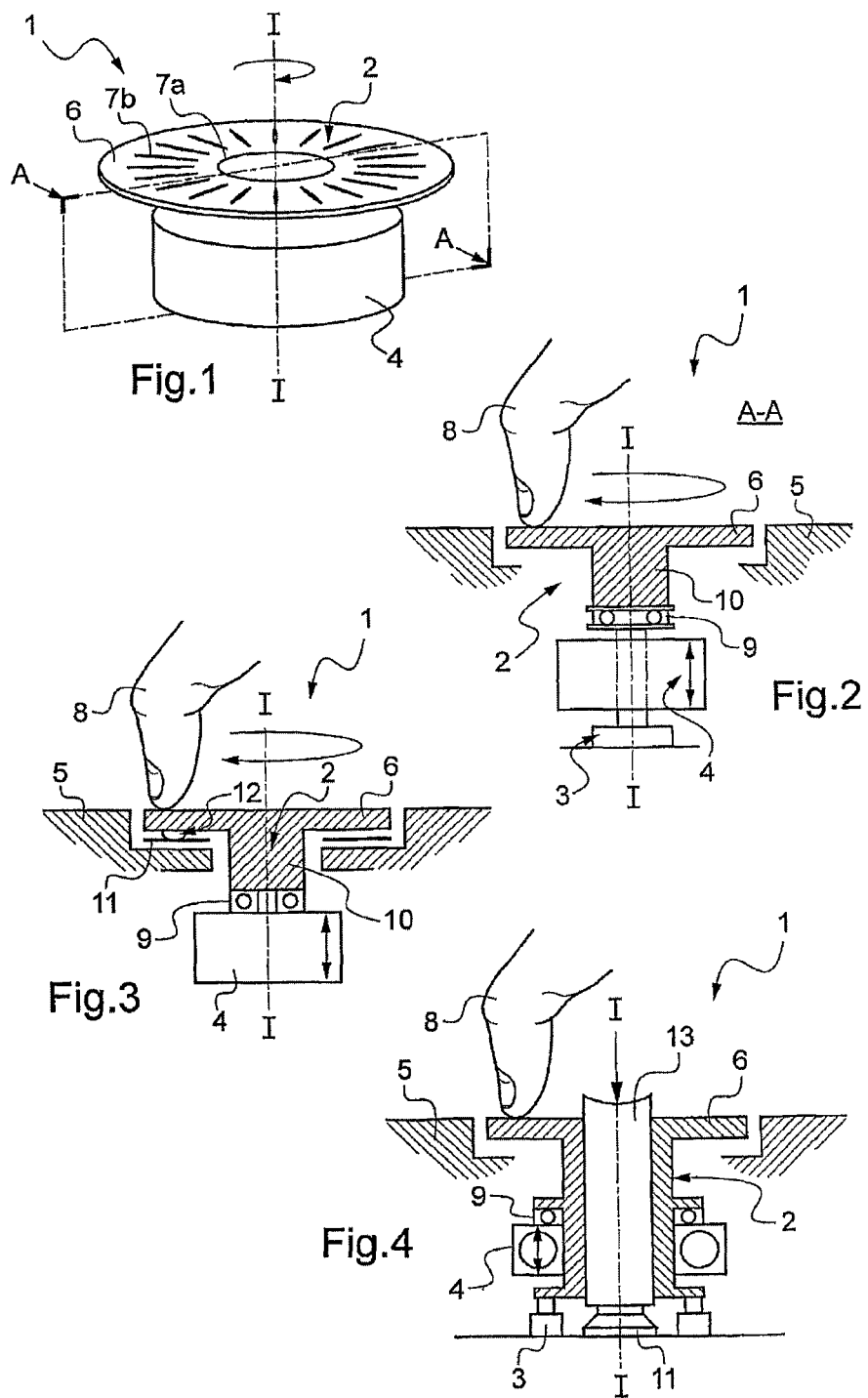

ROTARY CONTROL DEVICE WITH HAPTIC FEEDBACK

The present invention relates to a multifunction rotary control device with haptic feedback intended to be mounted in a control panel of a motor vehicle.

More specifically, such a control device is potentially applicable for the controls located in the central console and between the two front seats of a motor vehicle in order, for example, to control air conditioning functions, an audio system, a telephony system or even a navigation system. The control device can be used, for example, to navigate in a pop-up menu or to directly adjust these functions.

The invention can also be applied in a region of the vehicle called the dome or the ceiling which is located level with the usual position for the internal rear-view mirror, in order, for example, to control the internal lights, central locking, an opening roof, distress lights or ambience lights inside the vehicle.

The control device may also be used for the window raising and lowering controls, the controls for positioning motorized external rear-view mirrors, multifunction controls on the steering wheel or even controls for adjusting motorized seats.

In the automobile field, the controls of various electrical members are implemented conventionally by buttons/switches.

However, given the increasing number of electrical members to be controlled, control devices, called "multifunction control devices", that is to say devices capable of controlling a number of functions with a single control member, are increasingly being used because of the ergonomic advantages resulting therefrom. For example, from a single control member, implemented in the form of a rotary knob associated with a display screen, it is possible to navigate in pop-up menus to control the air conditioning functions, such as temperature or the intensity of the ventilation, the audio system such as the volume, or even the navigation system.

Most of the known multifunction control members are implemented with a knob to be grasped protruding from the control panel. The knob can be grasped by at least two fingers of the user, positioned in opposition, to rotate in one direction or in the other.

The tactile effects generated by the actuation of the knob, and the number of angular positions that said knob can take, are defined once and for all, and implemented by conventional mechanical solutions using, for example, elastic returns, and an associated guiding finger.

To increase the ergonomic comfort and modernize the design, style experts are focusing increasingly on "dematerializing" the interfaces, by making the interfaces less complex and less visible in the vehicle. This makes it possible to lighten the control panels of the vehicles by simplifying them and by improving the esthetics.

For this, the use of a technology involving sensors with touch-sensitive surface can be considered to be an interesting development.

In practice, a technology is known which, for example, uses pressure-sensitive resistors (also called FSR sensors, FSR standing for Force Sensing Resistor). Such sensors make it possible, for example, to produce "digitizer pads". Other touch-sensitive surface sensor technologies comprise, for example, contact matrix sensors or sensors of capacitive type.

The control devices that use this technology comprise a fixed sensor with touch-sensitive surface over which the user slides a control finger to move around in an associated pop-up menu, for example by a rotary motion on a sensor with ring-shaped touch-sensitive surface.

The control device then offers a simple, uniform and planar appearance, while allowing for the control of a multitude of functions.

In order to enable the user to blindly register the controls that he is applying on said device, the latter is equipped with one or more vibrators to generate haptic feedback on the sensor with touch-sensitive surface. Thus, the driver feels, on the end of his control finger brushing the touch-sensitive surface, a vibration indicating that his command has indeed been registered.

However, the jump in visual and touch-sensitive technology between the solid, protruding rotary control members and the sensors with planar and fixed touch-sensitive surface may seem abrupt to the users.

Furthermore, the comfort in activating interfaces with sensors with touch-sensitive surface depends on a number of factors, including the quality of the surface state of the sensor but also the pressure exerted by the finger of the user, the direction of activation, snagging of the finger of the user (dependent on its dampness) or even, for the sensors with touch-sensitive surface of capacitive type, the impossibility of wearing gloves to activate said touch-sensitive sensor.

The present invention aims to propose a multifunction rotary control device with haptic feedback, notably for navigation in a pop-up menu, which offers an ergonomic usage comfort which is better than those of the state of the art.

To this end, the subject of the invention is a rotary control device with haptic feedback intended to be mounted in a control panel of a motor vehicle, said rotary control device comprising:
- a rotary control member,
- an angular sensor representative of the angular position of said rotary control member and the output of which is intended to be linked to a processing unit of said motor vehicle,
- a device for generating haptic feedback coupled to said rotary control member to apply a vibration to said rotary control member, characterized in that said rotary control member has a control surface of generally planar form intended to be substantially flush with said control panel and in that said device for generating haptic feedback is intended to be controlled by said processing unit to select a predetermined vibration from a plurality of predetermined vibrations, so that said generation device applies the selected vibration to said rotary control member in response to the output signal of said angular sensor.

Thus, a single rotary control member of planar appearance can be used to control a plurality of functions, such as the air conditioning, the audio system or even the navigation system, with haptic effects which are dependent on the angular position of the rotary control member. It is thus possible to select a haptic effect according to the function that has to be controlled.

Once mounted in the control panel, the control surface is flush with the panel of the vehicle which then offers a uniform and planar appearance, as are the sensors with fixed touch-sensitive surface.

Furthermore, the haptic feedback created, on the one hand by the rotational driving of the control member and, on the other hand, by the haptic feedback generation device, makes it possible to be felt manually by the user like a classic, conventional protruding control member.

The control device thus provides a response to the new ergonomic criteria of the motor vehicle manufacturers, requiring a control member integrated in the control panel that can generate a conventional haptic feedback.

According to one or more features of the rotary control device, taken alone or in combination:

said control surface is in the form of a disk; the control surface in the form of a disk allows for optimized transmission of the mechanical vibrations, said control surface has guiding bulges to facilitate the catching of the user's control finger, said angular sensor comprises a sensor with touch-sensitive surface and at least one spacer fixed under said control surface, capable of sliding in rotation on said sensor with touch-sensitive surface, said spacer being provided to be able to transmit a pressure on said control surface to said touch-sensitive surface sensor; the angular sensor then has a small bulk, said rotary control member is coupled to said device for generating haptic feedback via a ball race, said rotary control device comprises a switching device intended to be positioned in the control panel under said control surface, said rotary control member can take a depressed position in which said control surface of said rotary control member actuates said switching device, said switching device comprises a sensor with touch-sensitive surface and said rotary control device comprises at least one spacer fixed under said control surface, said spacer being provided to be able to transmit a pressure on said control surface to said touch-sensitive surface sensor, said angular sensor and said switching device comprise a common touch-sensitive surface sensor; said spacer thus makes it possible at the same time to produce the switching of the switching device and said angular sensor; the control device that is obtained is then compact, robust, inexpensive and the switching is synchronized with the generation of the haptic feedback, said spacer is elastic and has a rounded form at the level of the contact with said touch-sensitive surface sensor, said rotary control device comprises a switching member passing through said rotary control member in a coaxial manner, said switching member being able to actuate a switching device positioned in the rotation axis.

Other features and advantages of the invention will become apparent from the following description, given as a nonlimiting example, in light of the appended drawings in which:

FIG. 1 is a perspective schematic view of a control device,

FIG. 2 is a view in transversal cross section of the device of FIG. 1, mounted in a control panel, FIG. 3 represents a cross-sectional view similar to FIG. 2 of a control device according to a first variant embodiment, and FIG. 4 represents a cross-sectional view similar to FIG. 2 of a control device according to a second variant embodiment.

In these figures, the same elements are given the same reference numbers.

The invention relates to an electric multifunction control device and more particularly to a rotary control device with haptic feedback, that is to say that the control is provided by the rotational driving of a finger of a user and that the latter feels haptic feedback, for example a vibration, in the control finger indicating that the command has been registered. The term "vibration" should be understood in the broad sense to mean any reciprocal motion, in particular micro-displacements with amplitudes less than 0.2 mm.

Such a device is intended to be mounted in a control panel of a motor vehicle, for example to control motorized seats, for window raising and lowering controls, motorized external mirror controls, ceiling controls such as interior lighting controls, controls for opening an opening roof, air conditioning controls, multifunction telephony, navigation or even audio system controls.

FIGS. 1 to 4 represent a rotary control device 1. The control device 1 comprises a rotary control member 2, an angular sensor 3a, 3b, 3c representative of the angular position of said rotary control member 2 and a device for generating haptic feedback 4.

The rotary control member 2 is intended to be mounted to rotate about a rotation axis I-I in a corresponding orifice formed in a control panel 5. The control member is, for example, intended to navigate in a pop-up menu on a display screen of said motor vehicle (not represented).

The rotary control member 2 has, on its top end, a control surface 6, which can be manipulated by a user, and of generally planar form intended to be substantially flush with said control panel 5.

In the assembled state in the control panel 5 (FIG. 2), the control member 2 is level with the outer surface of the control panel 5, and has a planar and uniform appearance. However, the control device 1 remains ergonomic because the user actuates the control member 2 by rotation.

Thus, a single control member 2, rotary and of planar appearance, is used to control a plurality of functions, such as the air conditioning, the audio system or even the navigation system, with haptic effects which are dependent on the position of the control member.

The haptic effects can also be chosen according to the angular position of the control member. It is therefore possible to select them according to the function which has to be controlled.

For example, and as represented in the figures, the control surface 6 is in the form of a disk. It is also possible to provide for the control surface 6 to have on the surface guiding bulges 7a, 7b, for example forming a central circular rib 7a and radial ribs 7b which are evenly distributed, to facilitate the catching of the user's control finger 8.

According to a first embodiment represented in FIGS. 2 and 4, the angular sensor 3a, 3b comprises a rotary encoder mounted on the rotary control member 2.

According to a second embodiment represented in FIG. 3, the angular sensor 3c comprises a sensor with touch-sensitive surface 11 and at least one spacer 12 fixed under the control surface 6. The spacer 12 is provided so as to be able to transmit a pressure on the control surface 6 to the touch-sensitive surface sensor and can slide in rotation over the sensor with touch-sensitive surface 11. For example, the sensor with touch-sensitive surface 11 uses the technology which uses pressure-sensitive resistors (also known as FSR sensor, FSR standing for Force Sensing Resistor). To facilitate its rotational sliding, provision is also made for the spacer 12 to be elastic and have a rounded form at the level of the contact with the touch-sensitive surface sensor 11. The angular sensor 3c then has a small bulk and is inexpensive.

The output of the angular sensor 3a, 3b, 3c is intended to be linked to a processing unit of the motor vehicle (not represented).

The device for generating haptic feedback 4 comprises, for example, an actuator, such as an electromagnetic (or "voice call") or a piezoelectric actuator. The device for generating haptic feedback can also use the magneto-rheological technology.

The device for generating haptic feedback 4 is mounted fixed in the control panel 5 and is mechanically coupled to the rotary control member 2 by a rigid link to convey the mechanical vibrations from the device for generating haptic feedback 4 to the control surface 6 while allowing for the rotation of the rotary control member 2.

For example, the rotary control member 2 is coupled to the fixed device for generating haptic feedback 4, via a ball race 9. The control surface 6 extends for example by a section 10 coaxial to the rotation axis I-I. The section 10 is, for example, produced in the form of a cylinder whose bottom portion is thinned to be housed in the ball race 9 and passes through the device for generating haptic feedback 4 to be connected to the angular sensor 3. The section 10 thus allows for the coupling of the device for generating haptic feedback 4 with the control surface 6. A vibration can thus be applied to said control member 2 in response to a rotation of the control member 2 performed by a user, in order to enable the user to register blind controls that he or she applies to the device 1.

The control surface 6 in the form of a disk topping the section 10 also allows for an optimized transmission of the mechanical vibrations. In practice, the vibrations run along the section 10 toward the top to then extend radially along the control surface 6.

It has been observed that this arrangement is particularly advantageous because the mechanical vibrations extend and develop radially outward. Thus, interferences that might reduce the amplitude of the vibrations are avoided. A coherent propagation of the surface waves is thus assured, which is comparable to the propagation of the surface waves which develop when, for example, a stone is thrown into a sheet of water.

Furthermore, the device for generating haptic feedback 4 is intended to be controlled by the processing unit to select a predetermined vibration out of a plurality of predetermined vibrations, so that the device for generating haptic feedback 4 applies the selected vibration to the control member 2 in response to the output signal of the angular sensor 3. The vibration can also be selected on the control member 2 by navigation in the pop-up menu.

Thus, the rotation of the control member 2, and/or the direction of rotation and/or the speed of rotation, are detected by the angular sensor 3a, 3b, 3c, which transmits it via a representative output signal to the processing unit. This processing unit comprises, for example, a microcontroller for determining, from the incoming signals, the angular position, the direction of rotation and/or the angular speed of the control member 2. Depending on the position, the direction of rotation and/or the speed detected as well as the navigation functions selected in the pop-up menu, the processing unit transmits, on the one hand, a command to an electric and/or electronic member or element and, on the other hands, selects a predetermined vibration from a plurality of predetermined vibrations and controls the generation device 4 for it to apply the selected vibration to the control member 2.

From a single ergonomic control device, it is then possible to navigate in pop-up menus to control a plurality of functions, such as the air conditioning, the audio system or even the navigation system, with haptic effects and predefined positions that can be adjusted according to the menus/functions activated.

It is, for example, possible to provide for the rotation of the control member 2 in the clockwise direction to increase the volume of a car radio of a vehicle by a spot vibratory haptic effect each time individual thresholds exhibiting an increasingly greater amplitude are exceeded. Furthermore, a displacement in the anticlockwise direction produces a reduction in the volume with a spot vibratory haptic effect each time individual thresholds exhibiting an increasingly lower amplitude are crossed. Distinguishing different rotation speeds (for example low speed/high speed) make it possible, for example, to vary the increase or the reduction in the volume by a factor corresponding to the increase or to the reduction in the volume with a novel constant vibratory haptic effect. Then, when the user navigates in another menu, for example relating to the setting of air conditioning parameters, the rotation of the control member generates other commands with other specific haptic effects. For example, a haptic effect can be used to vary the resisting torque opposing the rotation of the control member 2.

According to a first variant embodiment, the control device 1 comprises a switching device intended to be positioned in the control panel 5 under the control surface 6. The switching device comprises, for example, a switch linked to the processing unit. The actuation of the switching device makes it possible, for example, to select a function in the pop-up menu with a pressure on the control surface 6 axially to the axis I-I.

According to a first example which is not represented, the control member 2 may itself assume a depressed position in which the control surface 6 of the control member 2 actuates the switching device.

According to a second example illustrated by FIG. 3, the switching device 14a comprises a sensor with touch-sensitive surface 11. For example, the sensor with touch-sensitive surface 11 uses the technology which uses pressure-sensitive resistors (also known as FSR sensors, FSR standing for Force Sensing Resistor). In the case of a control surface 6 in the form of a disk, a touch-sensitive surface sensor of corresponding ring form is, for example, provided, positioned under the control surface 6.

Furthermore, the device 1 comprises at least one spacer 12 fixed under the control surface 6. The spacer 12 is provided so as to be able to transmit a pressure on the control surface 6 to the touch-sensitive surface sensor 11. In order to facilitate its sliding in rotation provision is also made for the spacer 12 to be elastic and be of rounded form at the level of the contact with the touch-sensitive surface sensor 11.

As can be seen in FIG. 3, the angular sensor 3c and the switching device 14a comprise a common touch-sensitive surface sensor 11. The spacer 12 thus makes it possible to produce the switching of the switching device 14a and measure the angular sensor 3c.

Thus, the rotation of the control member 2 drives the rotation of the spacer 12 over the surface of the touch-sensitive sensor 11. For example, a light pressure can be detected to perform an angular measurement representative of the angular position of the rotary control member 2 and a stronger pressure is characteristic of a confirmation at the same level of placement of the control finger 8 on the control member 2.

A control device 1 is thus obtained which is compact, robust and inexpensive and whose switching is synchronized with the generation of the haptic feedback.

According to a second variant embodiment represented in FIG. 4, the device 1 comprises a switching member 13 passing through the rotary control member 2 in a coaxial manner, the switching member 13 being able to actuate a switching device 14b positioned in the rotation axis I-I.

In this variant embodiment, the control surface 6 extends, for example, by a cylindrical section 10 coaxial to the rotation axis I-I and hollow to allow for the passage of the switching member 13. The section is connected to the angular sensor 3b positioned around the switching member 13 to be mounted on the control panel 5. The multifunction rotary control device thus offers an integrated appearance in the control panel, with good ergonomic comfort for the user and with haptic effects and predefined angular positions that are widely adjustable according to the menus/functions activated.

The invention claimed is:

1. A rotary control device with haptic feedback intended to be mounted in a control panel of a motor vehicle, said rotary control device comprising:
 a rotary control member that is configured to rotate about a rotation axis;
 an angular sensor representative of the angular position of said rotary control member and the output of which is intended to be linked to a processing unit of said motor vehicle; and
 a device for generating haptic feedback coupled to said rotary control member to apply a vibration to said rotary control member,
 wherein said rotary control member has a control surface of generally planar form intended to be substantially flush with said control panel, and wherein said device for generating haptic feedback is controlled by said processing unit to select a predetermined vibration from a plurality of predetermined vibrations, so that said generation device applies the selected vibration to said rotary control member in response to the output signal of said angular sensor,
 wherein the control surface extends by a section coaxial to the rotation axis, and
 wherein when the selected vibration is applied to the rotary control member, the selected vibration runs along the section toward a top of the section and then extends radially along the control surface.

2. The rotary control device as claimed in claim 1, wherein said control surface is in the form of a disk.

3. The rotary control device as claimed in claim 1, wherein said control surface has guiding bulges.

4. The rotary control device as claimed in claim 3, further comprising a switching device intended to be positioned in the control panel under said control surface.

5. The rotary control device as claimed in claim 4, wherein said rotary control member can take a depressed position in which said control surface of said rotary control member actuates said switching device.

6. The rotary control device as claimed in claim 5, wherein said switching device comprises a sensor with touch-sensitive surface and at least one spacer fixed under said control surface, said spacer able to transmit a pressure on said control surface to said touch-sensitive surface sensor.

7. The rotary control device as claimed in claim 6, wherein said angular sensor and said switching device comprise a common touch-sensitive surface sensor.

8. The rotary control device as claimed in claim 7, wherein said spacer is elastic and has a rounded form at the level of the contact with said touch-sensitive surface sensor.

9. The rotary control device as claimed in claim 1, wherein said angular sensor comprises a sensor with touch-sensitive surface and at least one spacer fixed under said control surface, capable of sliding in rotation on said sensor with touch-sensitive surface, said spacer being provided to be able to transmit a pressure on said control surface to said touch-sensitive surface sensor.

10. The rotary control device as claimed in claim 1, wherein said rotary control member is coupled to said device for generating haptic feedback via a ball race.

11. The rotary control device as claimed in claim 1, further comprising a switching member passing through said rotary control member in a coaxial manner, said switching member being able to actuate a switching device positioned in the rotation axis.

* * * * *